(12) United States Patent
Rahn (10) Patent No.: US 9,705,589 B2
(45) Date of Patent: Jul. 11, 2017

(54) METHOD OF RESIZING A PROTECTED ODUFLEX CONNECTION IN AN OPTICAL TRANSPORT NETWORK

(71) Applicant: Alcatel Lucent, Boulogne Billancourt (FR)

(72) Inventor: Juergen Rahn, Nuremberg (DE)

(73) Assignee: Alcatel Lucent, Boulogne-Billancourt (FR)

( * ) Notice: Subject to any disclaimer, the term of this patent is extended or adjusted under 35 U.S.C. 154(b) by 121 days.

(21) Appl. No.: 14/768,535

(22) PCT Filed: Mar. 4, 2014

(86) PCT No.: PCT/EP2014/054120
§ 371 (c)(1),
(2) Date: Aug. 18, 2015

(87) PCT Pub. No.: WO2014/139831
PCT Pub. Date: Sep. 18, 2014

(65) Prior Publication Data
US 2016/0028474 A1    Jan. 28, 2016

(30) Foreign Application Priority Data

Mar. 15, 2013   (EP) .................................... 13305303

(51) Int. Cl.
| | | |
|---|---|---|
| *H04B 10/032* | (2013.01) | |
| *H04J 14/08* | (2006.01) | |
| *H04J 3/16* | (2006.01) | |
| *H04L 12/707* | (2013.01) | |

(Continued)

(52) U.S. Cl.
CPC .............. *H04B 10/032* (2013.01); *H04J 3/14* (2013.01); *H04J 3/1652* (2013.01); *H04J 3/1664* (2013.01); *H04J 14/08* (2013.01); *H04L 45/22* (2013.01); *H04Q 11/0066* (2013.01); *H04J 2203/006* (2013.01); *H04J 2203/0067* (2013.01); *H04Q 2011/0081* (2013.01)

(58) Field of Classification Search
CPC .......... H04J 3/14; H04J 3/1652; H04J 3/1664; H04J 14/08; H04J 2203/006; H04J 2203/0067; H04B 10/032; H04L 45/22; H04Q 11/0066; H04Q 2011/0081
See application file for complete search history.

(56) References Cited

FOREIGN PATENT DOCUMENTS

| JP | 2013504952 | 2/2013 |
| JP | 2013236131 | 11/2013 |

OTHER PUBLICATIONS

Shew, S.; G.7044 Impact on G.7713; ITU-T Draft: Study Period 2009-2012; International Telecommunication Union; Geneva; CH, vol. Q14/Q11; Nov. 17, 2011; pp. 1-5; XP017568545; Ciena Canada.

(Continued)

*Primary Examiner* — Shi K Li
*Assistant Examiner* — Mina Shalaby
(74) *Attorney, Agent, or Firm* — Patti & Malvone Law Group, LLC (57) ABSTRACT

A method and related network node are provided which allow a hitless resizing of protected ODUflex connections in an Optical Transport Network. In order to synchronize resizing of active and protection paths (54, 55), a logical processing (60, 61) of resize overhead signals that are related to end to end signaling (RP) and/or connectivity check (TSCC) is introduced into a sink side connection function (58), which terminates a protection group.

12 Claims, 6 Drawing Sheets

(51) Int. Cl.
*H04Q 11/00* (2006.01)
*H04J 3/14* (2006.01)

(56) References Cited

OTHER PUBLICATIONS

ITU-T Standard, International Telecommunication Union; Hitless Adjustment of ODUflex(GFP)(HAO); G.7044/Y.1347 (Oct. 2011); ITU-T Standard, Geneva; CH, No. G.7044/Y.1347 (Oct. 2011); Oct. 29, 2011; pp. 1-32; XP017563729.

OPUflex OH

| Column Row | 15 | 1 | 2 | 3 | 4 | 5 | 6 | 7 | 8 |
|---|---|---|---|---|---|---|---|---|---|
| 1 | RCOH1 | BWR_IND | RES | RES | | | RES | | |
| 2 | RCOH2 | BWR_IND | NCS | RES | | | RES | | |
| 3 | RCOH3 | CRC-3 | | | | | RES | | |
| 4 | PSI | | | | | | | | |

OPUflex RCOH

HO OPUk OH

| Column Row | 15 | 1 | 2 | 3 | 4 | 5 | 6 | 7 | 8 |
|---|---|---|---|---|---|---|---|---|---|
| 1 | RCOH1 | RP | RES | RES | | | TPID | | |
| 2 | RCOH2 | TSCC | RES | RES | TSGS | CTRL | TPID | | |
| 3 | RCOH3 | CRC-3 | | | CRC-5 | | | | |
| 4 | PSI | | | | | | | | |

HO OPUk RCOH

METHOD OF RESIZING A PROTECTED ODUFLEX CONNECTION IN AN OPTICAL TRANSPORT NETWORK

FIELD OF THE INVENTION

The present invention relates to the field of telecommunications and more particularly to Optical Transport Network (OTN) transmission protection and more particularly to resizing of a protected connection being represented by a lower order optical data unit of flexible size.

BACKGROUND OF THE INVENTION

The ITU has defined in ITU-T G.709, in its latest version G.709 (02/12), the signals format and interfaces of the Optical Transport Network (OTN). The basic frame structure is an Optical Transport Module of size k (OTUk), where k can be 1, 2, 2e, 3, 3e2, or 4, where OTU2e and OTU3e2 are described in ITU-T supplement G.sup43 using the principles of ITU-T G.709. It contains framing and section overhead plus a bit-synchronously mapped transport entity termed Optical Data Unit of size k (ODUk). An ODUk contains a payload area plus ODUk overhead. An Optical Payload Unit (OPUk) is mapped into the payload area and carries a client signal or other lower order ODUs being time-division multiplexed.

In an Optical Transport Network, connections are switched on ODU level. The ODU is thus the switchable transport entity that travels along a network path. A network path can be represented by an ODUk. Here two possibilities are possible a direct LO ODUk without substructure which is directly carrying a client or more commonly a higher order (HO) ODUk which will carry multiple lower order (LO) ODUj, which each represent a network path.

While traditionally, each type of ODU had a certain nominal size, a ODU of flexible size termed ODUflex was later introduced to support a larger variety of client signal rates. This could be direct constant bitrate (CBR) signal clients resulting in particular bitrate ODUflexes with particular client adaptations or for the case of Packet data transport packet data commonly encapsulated into GFP frames. A HO OPUk is subdivided into a number of 1.25G tributary slots where an ODUflex can allocate any number of tributary slots. The selection of tributary slots is arbitrary, though all tributary slots should be part of the same ODUk. The size of the GFP mapped data ODUflex can thus be configured in granularity of 1.25G tributary slots up to the maximum number of tributary slots supported by the server ODUk.

To support variable traffic load situations, ITU-T G.7044 (10/11) defines a hitless resizing option for ODUflex connections during operation. The resize protocols defined through G.7044 mainly consists of two parts, the Link Connection Resize (LCR) protocol part and the Bandwidth Resize (BWR) protocol part which are involving section and ODU path layer, respectively.

As in all OSI Layer 1 transport networks, an important feature in OTN is end-to-end protection of network paths. In order to protect an active connection against failures, a redundant protection path is established, where in the case of a failure traffic is switched over from the failed active path to the protection path. Linear protection mechanisms for OTN are defined in ITU-T G.873.1 (07/11) and ODUk shared ring protection is defined in ITU-T G.873.2 (04/12).

However, a protection of ODUflex containers that are resized is not defined and supported in these standards. The problem lies in the complexity of the two part resize mechanism that involves section and path layers and the fact that for a protection to be operable, working and protection connections must have the same size and therefore would have to be resized at the same time, which is not easily possible.

In the recent contribution No. 2254 made to ITU SG15 by J. Youn et al from the Korean's Electronics and Telecommunications Research Institute, it is proposed that the working ODUflex is resized with the current two-step resizing mechanism, while the protection transport entity performs only link connection resizing without ODUflex bandwidth resizing. A new signal bit shall be defined to suppresses the bandwidth resizing process.

SUMMARY OF THE INVENTION

However, suppressing the BWR part of the resizing protocol does not appear to be a satisfactory solution, as this would not properly finalize the bandwidth resizing of the protection path and in case resizing of the protection paths fails due to a lack of available resources, would leave the resized working path without available protection path.

It is therefore an object of the present invention, to provide a method and related network nodes which allow a hitless resizing of protected ODUflex connections in an Optical Transport Network.

These and other objects that appear below are achieved by introducing into a sink side connection function, which terminates a protection group, a logical processing of resize overhead signals that are related to end to end signaling and/or connectivity check in order to synchronize resizing of active and protection paths.

More particularly, a method of resizing a protected connection, which is represented by a lower order optical data unit of flexible size, is provided. The protected connection contains a protection group including at least one active path member and at least one protection path member. The resizing is carried out using a two part resize protocol, which has a link connection resize protocol part and a bandwidth resize protocol part. The link connection resize protocol part is carried out to resize links along the at least one active path and the at least one protection path. The bandwidth resize protocol part is carried out to resize a capacity of the lower order optical data unit of flexible size. As part of the link resize protocol, confirmation signals indicating success or failure of resizing of the links along the at least one active path and the at least one protection path are exchanged and finally received at a connection function terminating the protection group. The connection function logically combines the confirmation signals from the at least one active path and the at least one protection path to produce a single logically processed output confirmation signal for a lower order optical data unit termination function which completes the bandwidth resize protocol part.

Additionally and/or alternatively, status signals that are exchanged along active and protection paths to indicate an activation and a termination of a resize operation, respectively, can be logically combined in the connection function providing the bridge and selector function of the protection group to synchronize a resizing operation.

By synchronizing resize operations and logically combining confirmation and/or status protocol messages, it is achieved that resizing is successful either for the entire protection group, or fails for all protection group members, thus leaving the protection group intact and operable all the time.

BRIEF DESCRIPTION OF THE DRAWINGS

Preferred embodiments of the present invention will now be described with reference to the accompanying drawings in which.

DETAILED DESCRIPTION OF THE INVENTION

ODUflex entities are use in OTN to carry various client specific data rates over optical transmission. One important case is to carry GFP (Generic Frame Processing) encapsulated Data PDUs over OTN, for which the option of hitless resize is defined in G.7044.

As mentioned, the transmission protection of ODUflex entities that are resized is not defined in the ITU standards. On the one hand, the processing of the resize protocol contains in two independent steps the Link Connection Resize (LCR) protocol and the Bandwidth Resize (BWR) protocol parts, which are involving section and ODU path layer. In order to resize both the active and the protection connections, two sets of section layer entities but only one path layer entity would be involved to complete the protocol. Currently, only the active section entity is capable to interact with the ODUflex path layer to complete the protocol. On the other hand, it must be made sure that the resizing of the protection connection takes place synchronized to the active set of sections, and that the protection connection is thus able to take over traffic in the case of a failure. Otherwise, a protection switch will lead to loss of traffic.

As mentioned earlier, the ODUk is the switchable transport entity that travels along a network path. This assumes that network nodes along the network path interconnect the individual ODUk entities through a switching matrix. The ITU rec. G.798 describes functional blocks of network equipment for the OTN.

The revised and recently approved version of ITU-T Rec. G.798 shows in Figure 14-5 the ODUk connection function processes, including those resize protocol signals that have to pass the ODU connection matrix. As will be explained below in more detail, the relevant signals that are required for the resize operation of an ODUflex container are the ODUk_CI_RP and ODUk_CI_TSCC, which have to be connected together with the ODUflex CI (Characteristic information).

First, the resize mechanism as such will be described in more detail:

The hitless resize processing is a resizing mechanism within the OTN that allows it to support an increase or decrease of ODUflex client data rate across its entire end-to-end path. The ODUflex path is transported over OTN transmission segments over a group of tributary slots (TS) in HO ODU entities over each transmission segment.

The hitless resize functionality allows the hitless grow or shrink of this server capability on the Higher Order transmission segments as well as the end to end ODUflex rate increase over the individual transmission segments as well as the Termination Sink and Source functions and a related adaptation to the packet client.

The packet client BW is encapsulated using the GFP (Generic Framing Procedure) encapsulation, to adapt the packet stream to the individual ODUflex. The resizable ODUflex(GFP) occupies the same number of tributary slots on every link of the server segments. In cases of bandwidth adjustment (i.e., increase or decrease), the same number of tributary slots on each link traversed by the resized ODUflex (GFP) must be involved.

This creates a protocol and related communication that is organized in two steps. These steps are reflected in two protocol parts the LCR (Link Connection Resize) and the BWR (Bandwidth Resize) protocol parts.

During LCR phase, the individual links building the server tributary slot capacity of the Higher Order ODU link connections that serve for the transport of the transported ODUflex will be resized, while in the BWR part, the ODUflex capacity itself will be resized. For the communication between the involved network element functions for the different protocol steps, different particular overhead information to be exchanged is defined and required.

Figure 1:
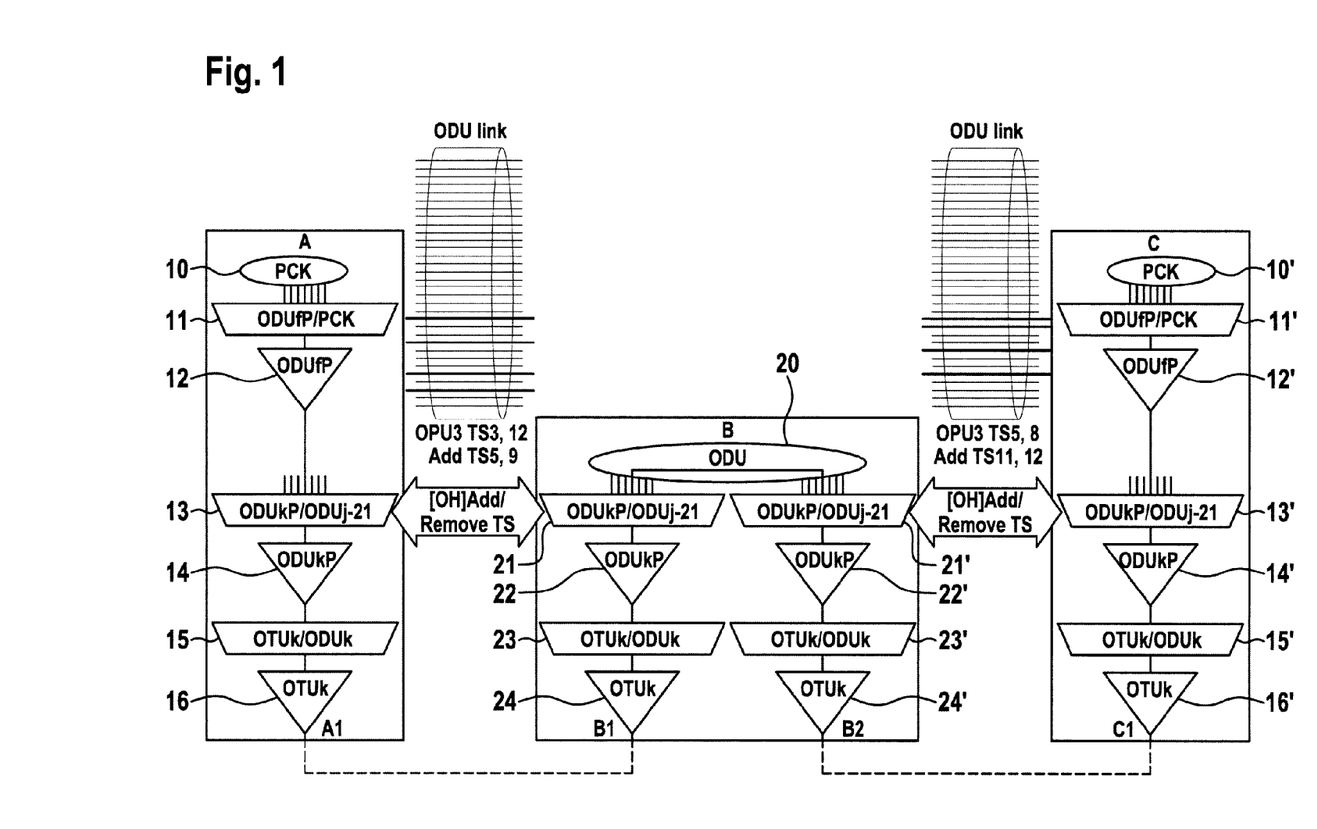
FIG. 1 shows an overview over the Link Connection Resize (LCR) protocol according to G.7044.
Figure 2:
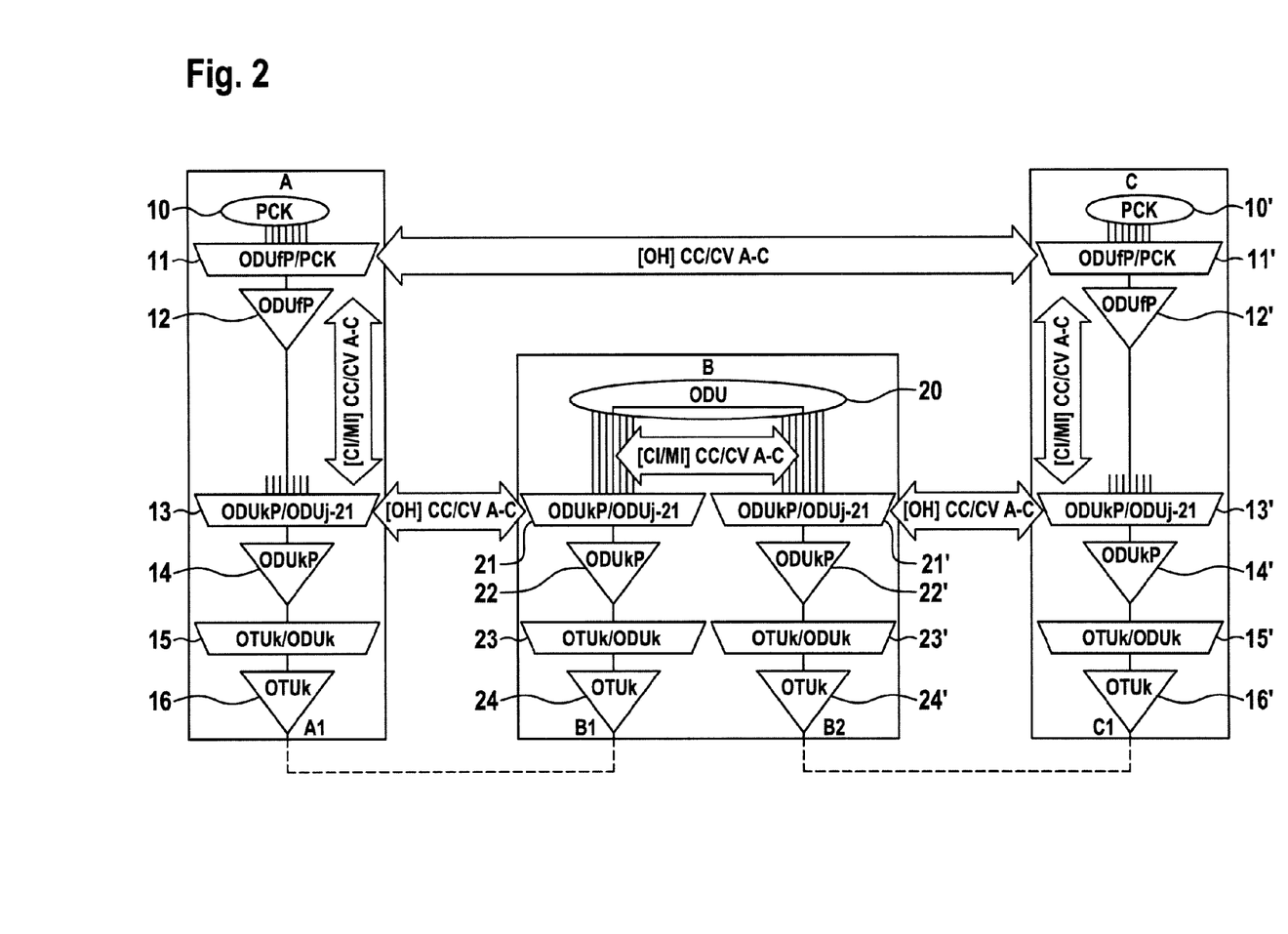
FIG. 2 shows an overview over the Bandwidth Resize (BWR) protocol according to G.7044.

The LCR protocol part is shown in more detail in FIG. 1, which is taken from G.7044 Figure 6-4 "LCR protocol", and the BWR protocol part is shown in more detail in FIG. 2 taken from ITU-T Rec. 7044 Figure 6-5 "BWR protocol". Both figures show three interconnected network nodes A, B, and C and the involved termination and adaptation functions thereof. It is assumed that a ODUflex connection exists between nodes A and C leading over node B. Transmission is bi-directional and all functions have functional elements in receive and transmit direction. A termination function for instance, has a transmit function that creates the respectively terminated entity (ODUk, OTUk etc) and a receive side function that that receives and processes the respective entity.

In node A, from top to bottom, this includes a packet layer source and sink function 10, a packet layer to ODUflex adaptation function 11, an ODUflex termination function 12, an ODUflex to HO ODUk adaptation function 13, a HO ODUk termination function 14, a ODUk to OTUk adaptation function 15, and a OTUk termination function.

Similarly node C has the same functional blocks labeled with references signs 10'-16' to distinguish them from their counterparts in network node A.

Node B has a LO ODU interconnection function 20, ODUflex to HO ODUk adaptation functions 21, 21', HO ODUk termination functions 22, 22', ODUk to OTUk adaptation functions 23, 23', and OTUk termination functions 24, 24'.

Optical links interconnect nodes A and B between an interface A1 and an interface B1 and nodes B and C between an interface B2 and C1. In order to establish a ODUflex connection between nodes A and B, interconnection function 20 needs to switch a crossconnection to interconnect the corresponding tributary slots from interface B1 to interface B2.

In the subject embodiment, the links between nodes A, B, and C are ODU3 links. Each ODU3 has a payload unit OPU3 with 32 1.25G tributary slots. The ODUflex connection initially occupies 2 tributary slots (TS). As mentioned, the timeslot assignment within the OPU3 is arbitrary. So, as an example, on the link between nodes A and b, tributary slots TS3 and TS12 are allocated, while on the link between nodes B and C, tributary slots TS5 and TS8 are allocated. This is symbolized in FIG. 1.

Link Connection Resize Protocol Function Overview

The LCR protocol for increase runs independently after being initialized on the Higher Order ODU sections to increase the number of TS used as server for the ODUflex for increase. When this increase is completed the completion will be signaled to the end points and the connectivity check of the end to end ODUflex on base of an OH signal will successful confirm completion.

For a decrease of the ODUflex rate the LCR protocol will pause until the reduction of the ODUflex bandwidth executed by the end to end BWR protocol is confirmed via OH communication to the individual sections. This will then trigger the per Higher Order ODU link protocol for removal of the now obsolete TS. An end to end confirmation to all involved entities will complete this protocol.

Coming back to FIG. 1, it is assumed that the existing ODUflex connection has to be resized to increase its capacity by two tributary slots. This during the LCR phase, the TS have to be assigned. The resize protocol will operate between the adjacent ODUflex adaptation functions 13 and 21 on the link between nodes A and B and on the link between nodes B and C ODUflex adaptation functions 21' and 13'. As a result of the LCR phase, tributary slots TS5 and TS9 will be added on the link between nodes A and B and tributary slots TS11 and TS12 will be added on the link between nodes B and C. In addition, a crossconnection will be established between TS5 and TS9 from interface B1 to TS11 and TS12 on interface B2 through connection function 20.

Bandwidth Resize Protocol Overview

The BWR protocol runs end to end on the ODUflex and for increase is triggered by signaling from the completion of the LCR protocol and a successful end to end connectivity check of the required number of timeslots. After this confirmation the BWR processing for increase is initiated and the ODU rate is increased to the required end value. This is then signaled end to end and after confirmation the protocol is completed For a decrease, the BWR on end to end first reduces the ODUflex capacity and rate and after that, the completion of this is communicated to the Link Connection layer and the LCR for reduce is triggered to perform the removal of the affected timeslots.

Coming back to FIG. 2, the BWR protocol is performed between ODUflex adaptation functions 11 and 11' in nodes A and C, respectively. The BWR protocol message flow runs from ODUflex adaptation function 11 to ODUk adaptation function 13. Protocol messages are then relayed between ODUk adaptation functions 13 and 21. Within node B, message flow goes through LO ODU connection function 20 to ODUk adaptation function 21'. Protocol messages are then relayed between ODUk adaptation functions 21' and 13' and within node C, between ODUk adaptation function 13' to 11'.

The Resize Overhead

For these processes, overhead signals to be transported and exchanged for communication, completion confirmation, and connectivity check are defined and have to be processed by the involved network nodes. As such there is the assumption of a 1:1 relation of Higher Order ODUk server entities and Lower Order resized ODUflex entity. In the case of protection architecture, the LCR has to run on at least two sets of Higher Order Server Link connections and communicate and confirm connectivity to one set of Lower Order ODUflex terminations and client adaptations.

At increase the LCR runs initially on a link by link processing independent from each other but for completion the communication with the BWR process and end to end connectivity check is required. In the case of a decrease the LCR also runs local on each link connection but will be triggered by the end to end completion of the BWR reduce process and afterwards also complete after end to end confirmation.

Figure 3:
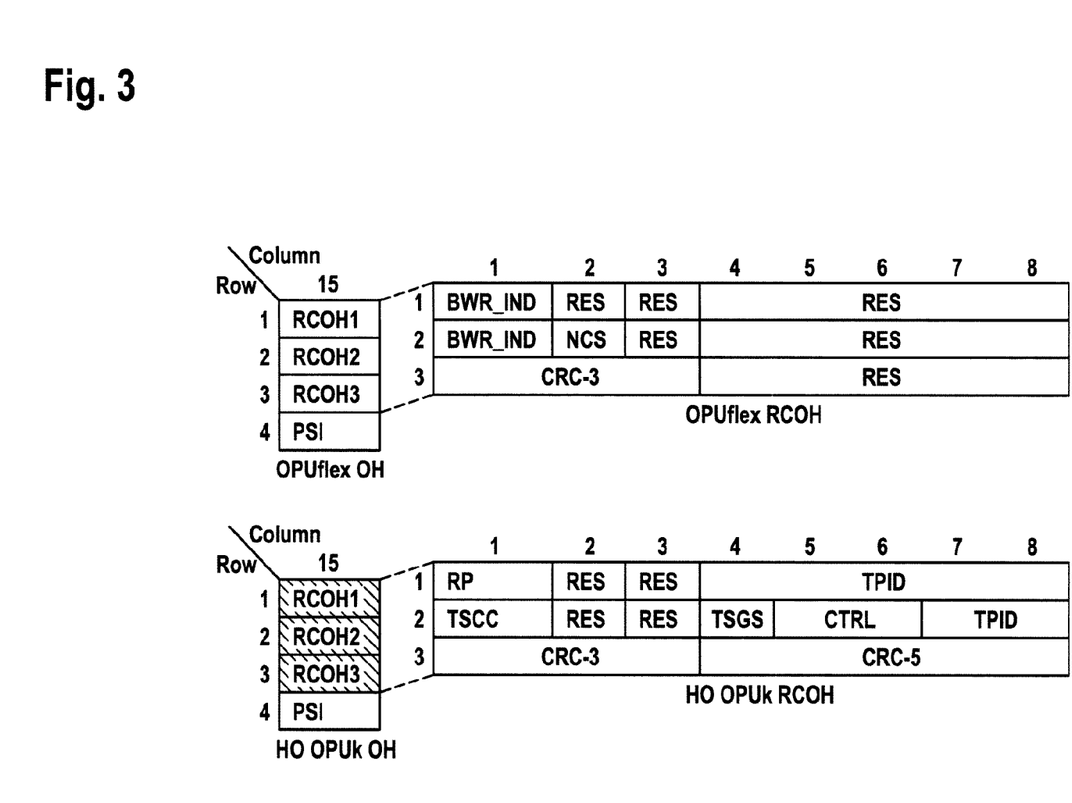
FIG. 3 shows Resize Control Overhead (RCOH) defined in G.7044.

The Resize Overhead as defined in G.7044 is found on two locations, the Higher Order OPU overhead for the individual link connections, and the OPUflex overhead located in the OPU part of the ODUflex frame running end to end between the ODUflex to Client adaptations. This is shown in FIG. 3, which is identical to Figure 6-2 of ITU-T G.7044. The resize overhead part in path overhead of the HO ODUk carrying the ODUflex, i.e. the HO OPUk OH contains in bit position 1 of RCOH1 and RCOH2, respectively, the two relevant signals RP and TSCC, which are part of the BWR protocol.

The overhead positions for this communication defined in G.7044 for the HO OPU overhead of the link connection and the related functions of these bits as defined in G.7044 are the Control (CTRL) field
  The control field is used to transfer LCR protocol status information from source to sink. It shall be used to provide the operation indication of the individual tributary slot that belongs to a specified. This is related to the LCR signaling per ODUflex server section and runs local on the particular sever link connections. So no special treatment in respect to protection architecture is required.

Tributary port ID (TPID) field
  The TPID field is used to identify the tributary port ID. The TPID field carries the tributary port number to which the tributary slot is to be added or to be removed. This is related to the LCR signaling per ODUflex server section and runs local on the particular sever link connections. So no special treatment in respect to protection architecture is required.

Tributary slot group status (TSGS) bit
  The TSGS bit is used for link connection acknowledgement indication. In the bandwidth increase case, the TSGS bit is generated by the HO OPU sink to acknowledge to the HO OPU source there is a match between the tributary slots indicated by the received CTRL and TPID as being added, and the provisioning for those tributary slots (by the management plane or control plane) at the sink end. It furthermore acknowledges that the HO OPU sink end is ready to receive the increase of the ODTUk.M into the ODTUk.M+N. In the bandwidth decrease case, the TSGS bit is generated by the HO OPU sink to acknowledge to the HO OPU source that the ODUflex(GFP) bandwidth has been decreased and that it has exited GMP special mode after receiving TSCC=0 in So to Sk direction. It furthermore acknowledges that the HO OPU sink end is ready to receive the decrease of the ODTUk.M into the ODTUk.M-N This is related to the LCR signaling per ODUflex server section and runs local on the particular sever link connections. So no special treatment in respect to protection architecture is required.

Tributary slot connectivity check (TSCC) bit

The TSCC bit is used to check the connectivity of the link connection and ODUflex(GFP) connection. It carries signaling information associated with a TS being added or removed and is propagated hop by hop from the source to the sink. Initially, the value of TSCC is set to 0. During the resize period, TSCC=1 confirms GMP special mode at intermediate nodes and signals to the sink that all NEs in the source to sink direction are ready to support the bandwidth resizing operation.

After the ODUflex(GFP) resize operation is complete, TSCC=0 is used by the source to indicate the bandwidth resize completion and its exit from GMP special mode in the source to sink direction. It triggers exit from GMP special mode at the intermediate nodes and sink, and is only forwarded by intermediate nodes when they have exited GMP special mode.

This bit of the Higher Order Link is used as confirmation of the link connection layer to the ODUflex layer that is going to be resized for confirmation that the capacity change of the individual link connections is completed and the end to end required capacity on the HO connections is available. This indicates the possibility of the start of the resize process of the ODUflex and is relevant in case of protection architecture.

Resizing protocol indicator (RP) bit

The RP bit is used to indicate whether the resizing protocol is carried in the RCOH. RP=1 indicates that the RCOH is carrying resizing protocol. When RP=0, these bytes carry overhead associated with the mapping specific information, such as GMP overhead (CnD), as defined in Recommendation G.709. At the beginning of the resize operation, the RP bit should be set to 1 by the management plane or control plane. The RP bit is reset to 0 by the source as indicated below in order to indicate that it has exited all resizing protocol processing. The RP=0 terminates the TSCC information relay and all other resizing processing operations in that direction at intermediate nodes. When an intermediate node receives RP=0, it forwards it after confirming that it has exited GMP special mode and terminated LCR protocol processing in that direction. When the sink receives RP=0, it confirms the exit from resizing processing by the source and all intermediate nodes. The sink can then report the resizing completion to network management or control plane.

This Bit of the Higher Order link is used as means to communicate from/to all involved functions, that the related status in the resize processing has been entered. This is also relevant from function in the worker and protection path and, while it is carried in the individual link connections, it is relevant for the ODUflex terminations and client adaptations as well as related to the worker and protection Higher Order ODU entities of the link connection layer. So as a consequence also this position requires special processing in protection architectures.

The overhead positions for this communication defined in G.7044 for the LO OPUflex overhead of the ODUflex trail are the:

Network connectivity status (NCS) bit

The NCS bit is used for a network connection acknowledgement indication. It is defined as an end-to-end acknowledgment indication in the OPUflex overhead. It is used by the ODUflex(GFP) sink to acknowledge to the ODUflex(GFP) source directly when the sink receives the correct TSCC value. The intermediate nodes do not need to process this signal since it is transparent to them When the sink receives TSCC=1, the NCS=1 is used by sink as an ACK for the source to the sink path resize preparation completion. When the sink receives TSCC=0, the NCS=0 is used by the sink to acknowledge the BWR completion. The NCS transparently passes through each intermediate node going back to source.

This runs end to end over the ODUflex and involves the client adaptations. No special treatment in case of protection is required as the link connections are agnostic to this information. However all functions are able to read and react due to the implicit bridging of this signal.

Bandwidth resize indicator (BWR_IND) bit

The BWR_IND bit is used to indicate that the ODUflex (GFP) source is adjusting the ODUflex(GFP) signal's bit rate. It is set to "0" before ODUflex(GFP) signal's bit rate adjustment starts. Once it transitions from "0" to "1", the ODUflex(GFP) source shall start ramping x μs later. When the BWR_IND will transition from "1" to "0", the ODUflex(GFP) source shall stop ramping y μs later. x is almost equal to y and shall be in the range of 125 to 250 μs.

The BWR_IND is used to trigger the start of the ramp at the downstream nodes, and to signal the end of the ramp. This is described in more detail in G.7044, chapters 7.1.1 and 7.2.1.

The BWR_IND signal is encoded into bit 1 of both the ODUflex(GFP) RCOH1 and RCOH2 bytes, as illustrated in FIG. 3. When BWR_IND is set, both bits are '1', and when it is reset both bits are '0'. The receiver determines a transition in the BWR_IND state after examining RCOH3. The CRC-3 values allow detection of an error affecting the BWR_IND bit in RCOH1 or RCOH2, and can be used to determine the correct value. The receiver rules are as follows:

The receiver determines that BWR_IND is set after examining RCOH1-RCOH3 when the BWR_IND bits in both RCOH1 and RCOH2 are set to '1' and the received CRC-3 has a value corresponding to the source sending BWR_IND set to '1' (and NCS set to '1').

The receiver determines that BWR_IND is reset after examining RCOH1-RCOH3 when the BWR_IND bits in both RCOH1 and RCOH2 are set to '0' and the received CRC-3 has a value corresponding to the source sending BWR_IND set to '0' (and NCS set to '1'). Otherwise, the receiver maintains its current value for the received BWR_IND.

This runs end to end over the ODUflex and involves the client adaptations. No special treatment in case of protection is required as the link connections are agnostic to this information. However all functions are able to read and react due to the implicit bridging of this signal.

The information of these positions is error protected by CRC codes added to the OPU overhead fields.

Capacity Increase

The capacity increase is principally processed in the way that first all the links are increasing the link capacity LCR protocol part, and if this is finished successfully and confirmed between the ODUflex trail endpoints, the BWR will start. This means that after the link capacities are completely increased, the bandwidth resize is started and processed end to end. The LCR is independent for each HO link connection as pre-condition for the end to end BWR protocol:

The description of the LCR increase as described in G.7044 is described below in more detail:

1. Every node starts the LCR protocol and BWR protocol after receiving the network management or control plane INCREASE command. After receiving the INCREASE command from the network management or control plane, every node checks the availability of the TS to be added (in EMF). Ports in intermediate nodes send [ADD, #a, NACK] (LCR Generator) as well as RP=1 and TSCC=0 (BWR Relay Generator) after the availability check. The ports in the two end nodes send [ADD, #a, NACK] (LCR Generator) and RP=1 and TSCC=0 (BWR Relay Generator).

2. After checking that the CTRL=ADD is received from the port at the other end of the span (LCR Generator) and the TS configuration of the local port is identical to what the port at the other end of the span is signaling (RCOH Receiver), each port sends TSGS=ACK signal (LCR Generator) as a reply to the adjacent port.

3. Every port starts link connection increase process after LCR handshaking successfully in both directions, meaning that the configuration check is passed and TSGS=ACK has been both sent (LCR Generator) and received (LCR Receiver) on all TS involved in the same link connection resize. After receiving the ACK for all the added TS, a port first sends [NORM, #a, ACK] instead of [ADD, #a, ACK] for every added TS at a resize multiframe boundary after LCR handshaking. Note that the time between when a node receives ACKs for all TS and the resize multiframe boundary at which it starts sending [NORM, #a, ACK] is implementation dependent. Then, at the first resize multiframe boundary after sending [NORM, #a, ACK], the node starts link connection increase using all the added TS. The change from [ADD, #a, ACK] to [NORM, #a, ACK] signals the downstream port that the link connection increase will start at the next resize multiframe boundary.

4. After completing the LCR resize and receiving CTRL=NORM, a node exits LCR protocol by sending [IDLE, 0, NACK] (LCR Generator) for every added TS at the resize multiframe boundary P. In other words, all affected TS make each of their signaling transitions simultaneously (in the same resize multiframe).

5. After checking that the CTRL=IDLE is received from the port at the other end of the span (LCR Generator) the LCR protocol is finished in one direction. It then begins the BWR protocol.

This processing is to be executed before the end to end ODUflex trail is affected and as such not influenced by the fact whether there is a protection architecture present or not up to this point.

The signal to acknowledge the completion of the LCR is the TSCC that will be set to 1 at the source endpoint and after LCR completion it is relayed trough the links serving the ODUflex trail. In the case of a protected ODUflex trail, both the worker and the protection links need to relay and forward this TSCC acknowledgment and the two TSCC signals have to be combined in an AND operation to ensure that both link connections are increased.

After this the BWR part of the protocol is started. Here, through signaling between the endpoints and towards all interim nodes, the bandwidth adjustment ramp is started as defined in G.7044 Clause 7.1 Step 3 and detailed description further in G.7044.

The description of the BWR part of the protocol as defined in G.7044 is explained below in more detail:

The steps of the BWR protocol of the bandwidth increase are:

1. When LCR protocol is finished and SCC=1 is received in the sink direction, the input port begins to set its GMP Sink processor into special mode (BWR Relay Receiver). When LCR protocol is finished in the source direction, the output port sets its GMP Source processor into special mode (BWR Relay Generator). The node is expected to perform any required internal buffer adjustments associated with the change in word size prior to entering GMP special mode in a given direction. After setting these GMP Sink and Source processors into special mode successfully, and confirming that there are no dTIM defects associated with the new matrix connections at the upstream nodes, the node relays the TSCC=1 in that direction and disables TCM dTIM-related consequential actions for the duration of BWR protocol (using the TIMActDis). When all intermediate nodes relay the TSCC=1, it propagates from source to sink.

2. When TSCC=1 and RP=1 for all the added TS reaches the ODUflex(GFP) sink node, the input port responds by setting NCS=ACK(1) (BWR Generator) to indicate that in this direction the whole path is OK and that its provisioning matches the TS configuration that it sees in the received TSCC values (RCOH Receiver). Since the NCS is located in the ODUflex(GFP) overhead area, NCS=ACK(1) passes transparently through each intermediate port back to the far end ODUflex(GFP) node.

3. When an end node receives TSCC=1, RP=1 and NCS=ACK and has sent NCS=ACK in response to TSCC=1, the bi-directional signaling is complete. It then begins the bandwidth increase. Bandwidth increase starts with setting BWR_IND to 1. Refer to 7.1.1 for details on increase rate. Bandwidth increase ends after setting BWR_IND to 0.

4. The ODUflex(GFP) source node begins to send out TSCC=0 instead of TSCC=1 (BWR Generator) to signal the completion of the bandwidth increase and its return to GMP normal mode in its transmit direction.

5. When an intermediate input port receives TSCC=0 and RP=1, it sets its GMP Sink processor into normal mode (BWR Relay Receiver) and forwards the TSCC=0 to the output port. When bandwidth increase ends and TSCC=0 is received, the output port sets its GMP Source processor now into normal mode (BWR Relay Generator). After setting these GMP processors into normal mode, TSCC=0 is immediately relayed through that node in that direction.

6. When TSCC=0 reaches the ODUflex(GFP) sink (BWR Receiver), the associated ODUflex(GFP) source sends a reply by setting NCS=NACK (BWR Generator).

7. When the end node receives and sends NCS=NACK, it begins to send out frames with RP=0 (BWR Generator). When an intermediate node receives RP=0 (BWR Relay Receiver), it transparently forwards it to downstream node (BWR Relay Generator). The increase operation is complete when RP=0 has propagated to the other end node, indicating that the intermediate nodes have ended their relay of TSCC information and all other resizing protocol operations. When the ODUflex(GFP) sink node receives RP=0 and has sent RP=0 in the opposite direction, it reports to network management or control plane the completion of the increase resizing process in that direction (BWR Generator).

8. The total process is complete when the network management or control plane has received, indication of completion of both directions.

Here the relevant signals that are related to the end to end signaling and connectivity check are processed and these signals have to be subject of special treatment in the connection function in respect to protection.

After successful completion all protocols are terminated. The end to end communication and acknowledgement of the termination are signaled to the involved nodes and functions via the related OH signals. Here the end to end important signals giving the interlayer relation are the relayed signals through the matrix connections are the TSCC and RP signals. With the transition of TSCC and RP to 0 the successful end of the protocol is signaled. (Step 6, 7, 8 in the BWR protocol description of BWR increase in clause 7.1 ITU-T Rec. G.7044.)

Capacity Decrease

The capacity decrease is principally processed in the way that first a check is performed to all the links that are to be decreased if the information which TS are to be removed are available and consistent. After that the link capacity LCR protocol part is paused and between the ODUflex trail endpoints the BWR will start and the ODUflex BW will be reduced to the required value. The completion of this will be signaled—and this signaling and confirmation is again a protocol part that is related to worker and protection links—and will be relevant for treatment in the connection function.

After the confirmation of the BWR, the LCR part of the capacity decrease will be processed and signaled for worker and protection BW. After completion, the end-to-end signaling confirmation will be used to terminate the protocol and the OPU OH will be switched back to normal operation. Detailed process description as defined by G.7044 is explained below:

The protocol starts with LCR after decrease initialization, in a protection architecture for worker and protection BW.

The LCR signaling in this description uses the format [<CTRL value>, <TPID#>, <TSGS value>].

1. Every node starts the LCR protocol and BWR protocol after receiving the network management or control plane DECREASE command. After receiving the DECREASE command from the network management or control plane, every node checks the usage of the TS to be removed (in EMF). Ports in intermediate nodes send [REM, #a, NACK] (LCR Generator) as well as RP=1 and TSCC=0 (BWR Relay Generator) after the usage check. The ports in the two end nodes send [REM, #a, NACK] and RP=1 and TSCC=0 (BWR Relay Generator).
2. After checking that the CTRL=REM is received from the port at the other end of the span (LCR Generator) and the TS configuration of the local port is identical to what the port at the other end of the span is signaling (RCOH Receiver) each port sets its GMP Source or GMP Sink processor into special mode. Now, the LCR protocol is paused and a port continues with the BWR protocol. After receiving TSCC=1, each input port sets its GMP Sink processor into special mode The TSCC and RP information is passed end to end and used in the ODUflex trail end point functions and subject of the special protection treatment in the connection functions.

After this the BWR part starts and the ODUflex BW is reduced and the protocols are continued in the following way:

1. When LCR protocol in an output port (within an end node or an intermediate node) is paused, the output port sets its GMP Source processor into special mode (BWR Relay Generator). The node is expected to perform any required internal buffer adjustments associated with the change in word size prior to entering GMP special mode in a given direction. After setting the GMP Source processor into special mode successfully, and confirming that there are no dTIM defects associated with the new matrix connections at the upstream nodes, the output port relays a received TSCC=1 in that direction (BWR Relay Generator) and disables TCM dTIM-related consequential actions for the duration of BWR protocol (using the TIMActDis). TSCC is sent in the HO OPUk overhead associated with each to be removed TS.
2. When LCR protocol in an input port (within an end node or intermediate node) is paused, the input port begins to set its GMP Sink processor into special mode after receiving TSCC=1 (BWR Relay Receiver). The node is expected to perform any required internal buffer adjustments associated with the change in word size prior to entering GMP special mode in a given direction. After setting the GMP Sink processor into special mode successfully, and confirming that there are no dTIM defects associated with the new matrix connections at the upstream nodes, the input port relays the TSCC=1 (BWR Relay Receiver) in that direction and disables further TCM dTIM consequential actions for the duration of BWR protocol (using the TIMActDis).
3. When all intermediate input and output ports relay the TSCC=1, it propagates from source to sink.
4. When TSCC=1 for all the removed TS reaches the ODUflex(GFP) sink, it responds by setting NCS=ACK(1) (BWR Generator) to indicate that in this direction the whole path is OK. Since NCS is located in the ODUflex overhead area, NCS=ACK(1) passes transparently through each node and far end ODUflex(GFP) end node.
5. When an ODUflex(GFP) end node receives both TSCC=1 and NCS=ACK(1) and has sent NCS=ACK(1) in response to TSCC=1, the bi-directional signaling is complete. It then begins the bandwidth decrease. Bandwidth decrease starts with setting BWR_IND to 1. Refer to 7.2.1 for details on decrease rate. Bandwidth decrease ends after setting BWR_IND to 0.
6. After setting its GMP Source processor into normal mode (BWR Relay Generator), the ODUflex(GFP) source node begins to send out TSCC=0 instead of TSCC=1 (BWR Generator, BWR Relay Generator) to signal the completion of the bandwidth decrease direction and its return to GMP normal mode in its transmit direction.
7. When an intermediate input port receives TSCC=0 and RP=1, it sets its GMP Sink processor into normal mode (BWR Relay Receiver) and forwards the TSCC=0 to the output port. The output port sets its GMP Source processor now into normal mode (BWR Relay Generator). After setting these GMP processors into normal mode, TSCC=0 is immediately relayed through that node in that direction.
8. When TSCC=0 reaches the ODUflex(GFP) sink (BWR Receiver), the associated ODUflex(GFP) source sends a reply by setting NCS=NACK(0) (BWR Generator).
9. When the ODUflex(GFP) end node receives and sends NCS=NACK(0), the BWR protocol is almost complete and the LCR protocol can resume.
10. When the ODUflex(GFP) end node receives and sends NCS=NACK, it sets RP=0 (BWR Generator). The BWR Relay Generator blocks the forwarding of this RP=0 onto the output port until the LCR protocol is finished.
11. When the LCR protocol is finished at an ODUflex(GFP) end node it will unblock the forwarding of RP=0. When an intermediate input port receives RP=0 (BWR Relay Receiver), it transparently forwards it to its associated output port (BWR Relay Generator). The increase operation is complete when RP=0 has propagated to the ODUflex(GFP) far end node, indicating that the intermediate nodes have ended their relay of TSCC information and all other resizing protocol operations. When the ODUflex (GFP) sink node receives RP=0 and has sent RP=0 in the opposite direction, it reports to network management or control plane the completion of the decrease resizing process in that direction (BWR Generator)

The TSCC and RP information is passed end to end and used in the ODUflex trail end point functions and subject of the special protection treatment in the connection functions in the case of the ODUflex protection.

The LCR part of the protocol after ending the PAUSE and the completion of the BWR decrease is processed in the following steps. This is independent per link connection for worker and protection links and the RP signaling is used in the protection endpoints.

1. When triggered by the BWR Relay Generator process, an output port sends TSGS=ACK(1).
2. When sending CTRL=REM and TSGS=ACK and receiving CTRL=REM and TSGS=ACK(1) on the same side, after an implementation dependent time, a port sends [NORM, #a, ACK] for every TS being removed at the same resize multiframe boundary (RMF boundary 1) (LCR Generator). After sending [NORM, #a, ACK], a port performs ODUflex(GFP) link connection decrease. The change from [REM, #a, ACK] to [NORM, #a, ACK] signals the downstream port that the link connection decrease will start at the next resize multiframe boundary (RMF boundary 2).
3. After an implementation specific time after completing the LCR resize and receiving NORM for every TS being removed, a port exits the LCR protocol by sending out [IDLE, 0, NACK] for every TS being removed at the resize multiframe boundary P (LCR Generator).
4. When the output port on an ODUflex(GFP) end node has completed the LCR protocol, it forwards RP=0.
5. An output port on an intermediate node forwards RP=0 after it finishes the LCR protocol (BWR Relay Generator). An input port relays the incoming RP=0 (BWR Relay Receiver).
6. When an ODUflex(GFP) end node receives RP=0 and has sent RP=0 in the opposite direction, it reports to the network management or control plane the completion of the decrease resizing process in that direction.

With this signaling and combined processing of the OH information at the endpoint connection functions and ODUflex trail endpoints the decrease part of the protocol is finished.

Protection switching and Resize Overhead Processing

Figures 14-9 to 14-13 of G.798 shows the protection related processing functions. Application of these processing functions will lead to the behavior shown in FIG. 4.

Figure 4:
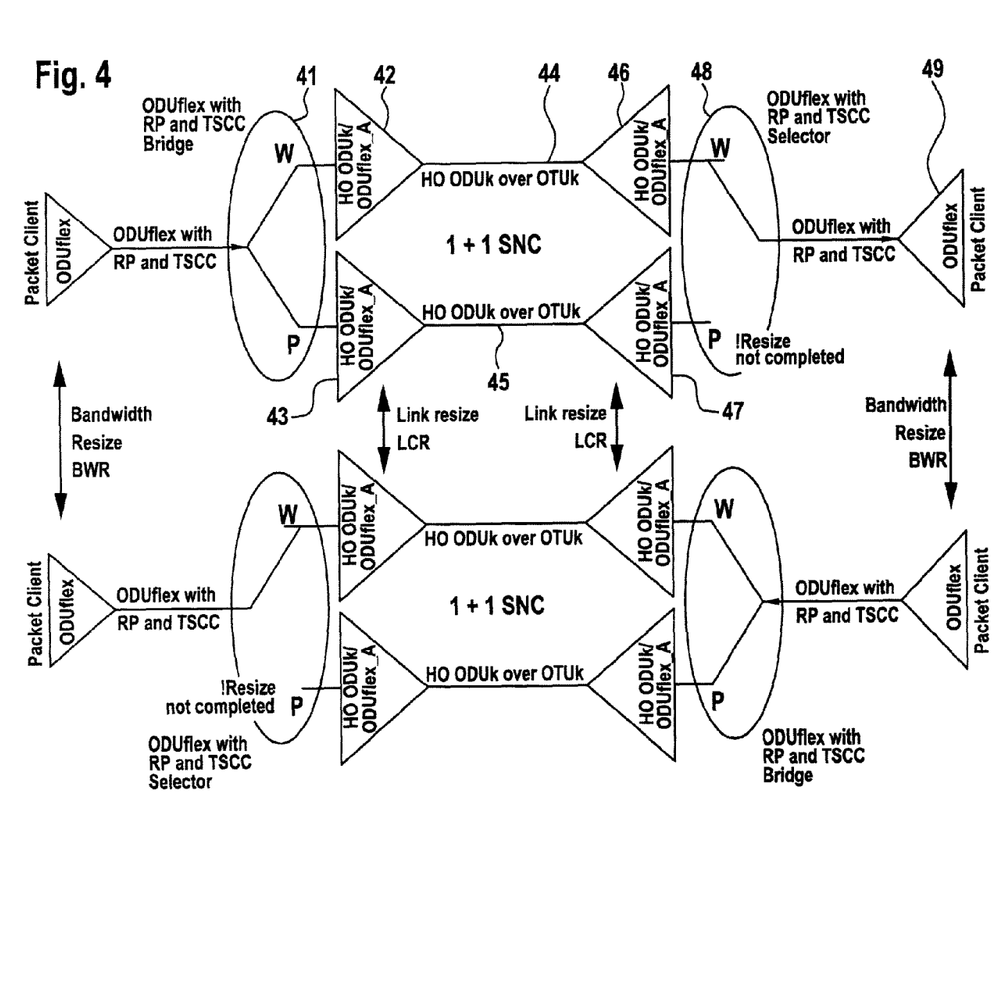
FIG. 4 shows a protected ODUflex connection, where resizing could not be completed.

FIG. 4 shows a bidirectional 1+1 linear path protection, which in ITU terminology is termed SNC (Sub-Network Connection). A source function 40 in a first network node creates a ODUflex signal along with RP and TSCC protocol bits. A connection function of the first network node bridges the ODUflex with the respective RP and TSCC bits to a working (W) section termination function 42 and protection (P) section termination function 43. Section termination functions 42, 43 map the ODUflex as LO ODU via HO ODUk into OTUk frames and transmit these. Multiplexed into different HO ODUk/OTUk, the LO ODUflex travels in parallel over two redundant network paths, a working path 44 and a protection path 45, until it reaches a destination node at the far end of the 1+1 SNC. Section termination functions 46 and 47 receive the signals, terminate the section overhead and extract the ODUflex and its RP and TSCC protocol bits from the HO OPUk OH. The signals are fed to a selector 48, which selects the signal from the working path W and in case of a failure switches to select the signal from the protection path P. The selected ODUflex, RP and TSCC signals are fed to the sink function 49. The signal flow in the reverse direction is the same with interchanged roles between the two network nodes.

In order to complete a bandwidth resize operation, the link resize operations using LCR protocol must be performed at the level of the section termination functions 42, 43 and 46, 47, respectively. In addition, the bandwidth resize operations using the BWR protocol must be performed at the level of source and sink functions 40, 49. Since, however, the RP and TSCC signals, which the BWR protocol requires, are selected from only the working path W, the resize operation cannot be completed for the protection path P. If the resize of the protection path P fails, maybe due to insufficient available resources, protection is no more operable at all.

Therefore, in order to avoid this deficiency, the present embodiments provide a special processing, as will be described below. This solution presented by the subject embodiments is applicable for all kind of protection architectures, including linear 1+1, 1:1, and shared 1:n protection as defined in ITU-T G.873.1, Shared Ring Protection (SRP) as defined in ITU-T G.873.2, and also Shared Mesh Protection (SMP) currently under discussion in IITU-T SG15.

Figure 5:
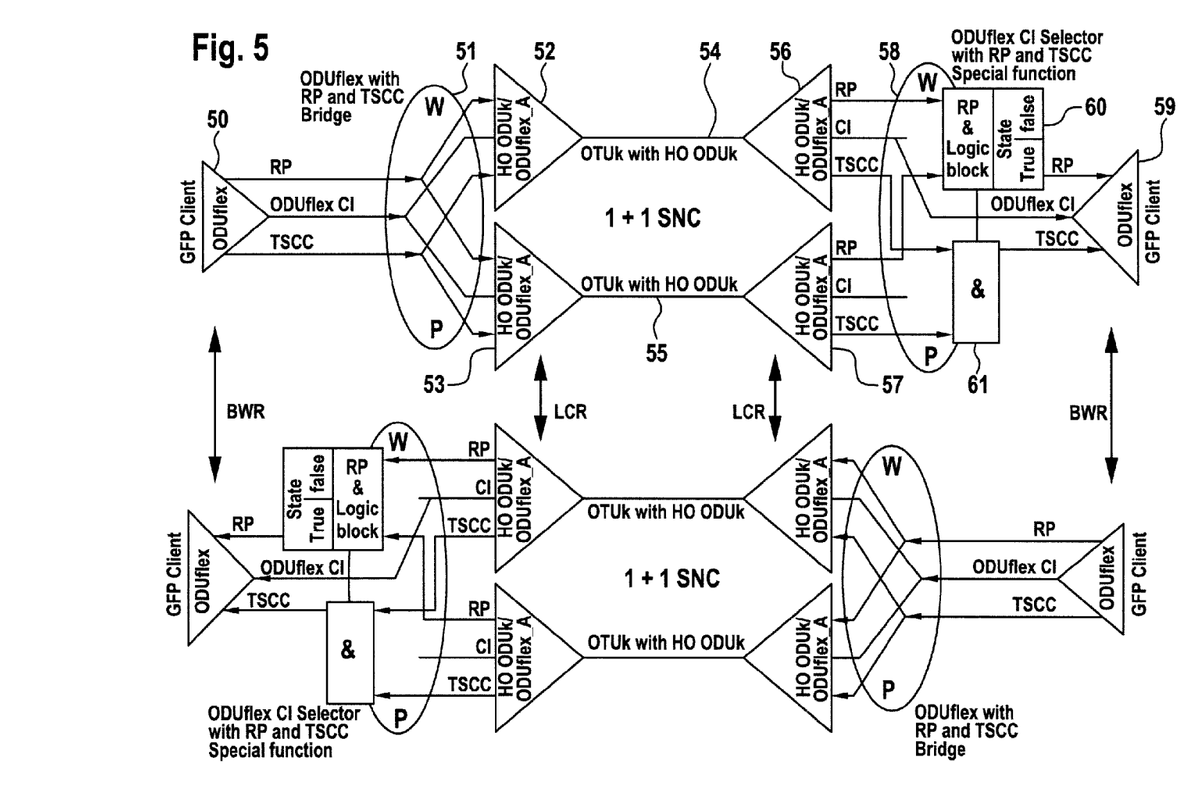
FIG. 5 shows an embodiment for resizing a ODUflex connection with 1+1 linear path protection.

FIG. 5 shows signal flow and resize overhead processing for a linear 1+1 protection. As in FIG. 4, the network connection between a first and a second network node is bidirectional and signal flow and processing is symmetrical in the two directions. Therefore, only one direction, i.e. from left to the right on FIG. 5 is described. The vertical double arrows labeled with BWR and LCR, respectively, indicate a bidirectional protocol exchange of resize overhead messages in go and return directions (i.e., from left to right and vice versa) between nodes terminating a section in case of LCR protocol stage and end-to-end in case of BWR protocol stage.

The left network node contains a source function 50 for an ODUflex, which carries a GFP encoded client signal. Source function 50 connects to a bridge function 51, which bridges an ODUflex CI signal coming from ODUflex source function 50 to two HO ODUk source functions 52, 53, where the ODUflex is adapted to and multiplexed into ODUk for transmission over two redundant network paths 54, 55. Network paths 54, 55 represent the active and protection paths of a 1+1 SNC (sub-network protection connection).

At the right hand network node, where the two redundant ODUk are received and terminated by respective ODUk termination functions 56, 57, the ODUflex CI signal is extracted from the two ODUk received in parallel from active and protection paths 54, 55, respectively, and fed to a selector 58. Selector 58 selects under normal operation the signal received from the active path 54 and switches in case of a failure to the signal received from the protection path 55.

It is now considered, that the 1+1 protected ODUflex connection has to be resized. Beside the ODUflex CI, the relevant protocol messages RP and TSCC are shown.

As mentioned above, the RP bit is used to indicate that the resizing protocol is carried in the RCOH. At the beginning of the resize operation, ODUflex the RP bit will be set to 1 at source function 50. When all resizing protocol processing has been finalized, termination function 50 will reset the RP bit to 0. The RP=0 will terminate the TSCC information relay and all other resizing processing operations in that direction at intermediate nodes.

The TSCC bit is part of the Higher Order Link and is used to check the connectivity of the link connection and ODU-flex(GFP) connection. It carries signaling information associated with a TS being added or removed and is propagated hop by hop from the source to the sink. Initially, the value of TSCC is set to 0 at ODUflex source function 50. During the resize period, TSCC=1 confirms GMP signals to the sink that all network nodes along the path from source to sink are ready to support the bandwidth resizing operation. After the ODUflex(GFP) resize operation is complete, ODUflex source function 50 will set TSCC to 0 to indicate the bandwidth resize completion.

TSCC is thus used as a confirmation of the link connection layer to the ODUflex layer that is going to be resized for confirmation that the capacity change of the individual link connections is completed and the end to end required capacity on the HO connections is available. This indicates the possibility of the start of the resize process of the ODUflex.

At the connection function 51 where the protection is sourced, the resize related overhead signals of the resize protocol including RP and TSCC are bridged together with the CI of the ODUflex. The same architecture, i.e. a broadcast bridge, is used for the RP and TSCC. Active and protection ODUk source functions 52, 53 map the RP and TSCC bits received from ODUflex source function into the respective resize overhead in the OPUk OH position shown in FIG. 3. As indicated in FIG. 1, intermediate network nodes along the paths 54, 55 relay the RP and TSCC bits from input to output, so that these finally reach the far end network node terminating the ODUflex connections.

Thus, ODUk sink functions 56, 57 receive the RP and TSCC bits from active and protection paths 54, 55, respectively, extract these control bits and forward the latter to connection function 58.

At connection function 58, which provides the sink end of the protection group, the RP and TSCC signals are combined using logic functions 60, 61, rather than the selector as for the ODUflex CI. The results of the logic function operations 60, 61 is fed to the outgoing connection function interface which connects to ODUflex termination function 59.

All sections between network elements along the network paths 54 and 55 will be resized in a conventional manner using LCR protocol explained above. To this point, no difference exists for the LCR phase between the worker and protection entity. The bandwidth resize operation is identical for active worker and protection entity also for the NCS bit and BWR_IND bits in the BWR protocol which are carried in the OPUflex overhead. This will ensure that the worker entity and protection entity are resized in a coordinated way and the BWR (bandwidth resize protocol) is triggered together and so at any point same BW is available at worker and protection entity and no extra hit is created in case of a protection switch.

At the network node terminating the ODUflex protection connection, logic function 60 terminates the RP bits from active and protection paths 54, 55. In particular, the state transition from 0 to 1 indicates the begin of the resize operation. Logic function 60 will thus output logic 1 if and only if both RP from active and protection paths 54, 55 indicate a transition from 0 to 1 and will output logic 0 otherwise. For the transition from 0 to 1, logic operation 60 thus may contain a logic AND operation for the RP bit output status generation.

Conversely, a transition from 1 to 0 indicates termination of the resize operation. Logic function 60 will thus return back from logic 1 to logic 0 if and only if RP from active and protection paths 54, 55 indicate a transition from 1 to 0 and will continue outputting logic 1 otherwise. For the transition from 1 to 0, logic function 60 thus may contain a logic NOT AND function for the RP bit output status generation.

TSCC as explained indicates a successful completion of the link resize operation. Therefore, logic function 61 performs a logic AND operation so that the output is logic 1 if and only if TSCC from active and protection paths 54, 55 indicate logic 1, i.e. a successful completion of the LCR stage.

In the case that the resize on either the working or the protection paths 54, 55 is not successful, maybe because of insufficient available resources, the TSCC and RP signals is will not reach ODUflex termination function 59 and the resize protocol processing is not completed. This means that the link will not be resized on either of the working and protection entities 54, 55. In other words, only both connections 54, 55 will be resized or none, so that the ODUflex path protection remains operable all the time. Moreover, resize operations on both connections 54, 55 stay synchronized, so that even in the event of a failure that activates a switch-over, no loss of data will occur.

Figure 6:
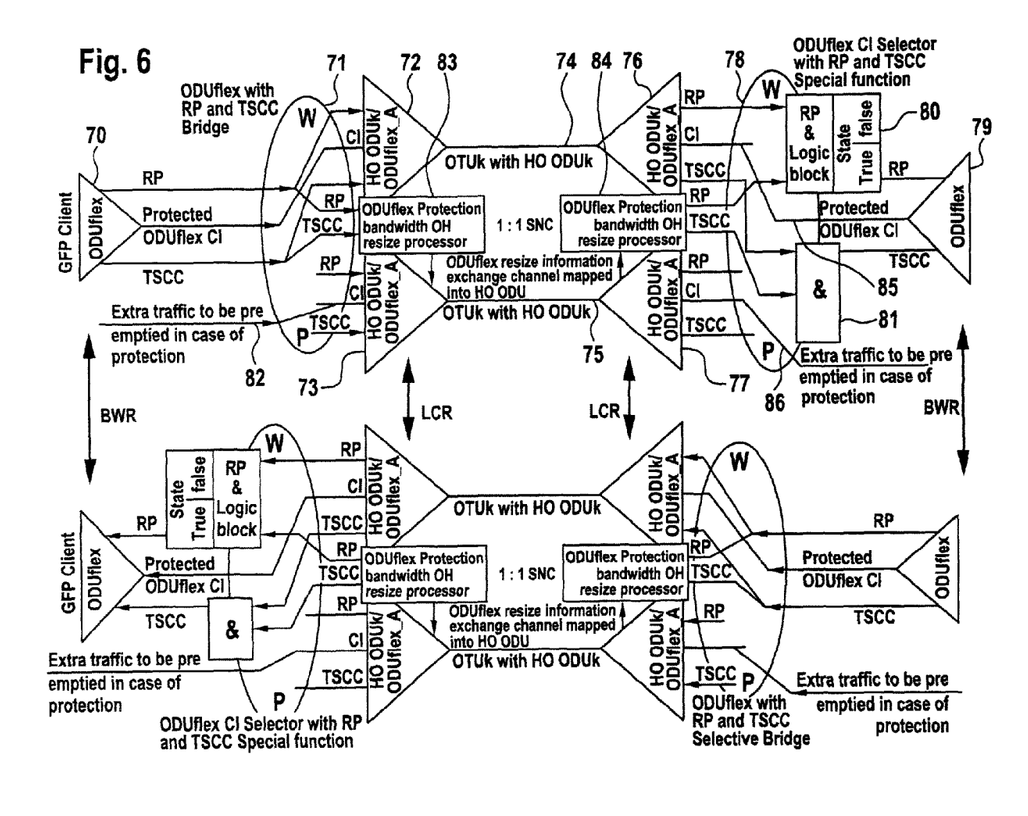
FIG. 6 shows an embodiment for resizing a ODUflex connection with 1:1 linear path protection.

A second embodiment is shown in FIG. 6. The solution presented there is applicable for linear 1:n protection as defined in G.873.1, but also for OTN SRP as defined in G.873.2, and SMP protection architecture, which all do not provide a permanent bridge in the connection function located at the ODUflex protection group source.

In particular, the second embodiment is different in that no permanent bridge is available and due to this no permanent protection entity. In the case of a protection switch the correct configuration is to be loaded into the related HO LO ODU adaptation functions and connection functions.

As a consequence, the resize signaling in the HO OPU OH is not available in the HO OPU OH and LO OPUflex OH. Therefore, the present embodiment uses on the protection entity sections an additional Resize OH channel, which is separate from the Resize OH in the HO OPU positions. This can either be a bit oriented signaling in OH positions reserved and/or not used by current G.709 G.873.1, G.873.2 and G.7044 signaling or a packed oriented messaging channel on some of these unused OH positions.

The more appropriate resize signaling channel for the inactive protection entity may be the message oriented channel option that uses a packet encapsulating of the resize OH of the HO ODU sections and feeds it to a resize OH processer that emulates the HO to LO ODU adaptations of the communicating OTN network elements and the matrix connections in the related network elements. This would be possible because of the fact that the processing is not time critical and mostly related to information status change.

The exact format and server bit positions of this channel is of secondary importance and could be chosen by those skilled in the art as needed. For instance the additional resize overhead channel can use parts of management communication bandwidth.

Also the BWR capacity ramp for the GMP (Generic Mapping Procedure) is to be emulated in the resize processing function. The signals to be mapped per "N" instances of protected ODUflex(es) are the OH signals as defined in G.7044. Those bits are the complete set of signals which are carried in the HO OPU and ODUflex resize OH and are to be made available at the interim nodes for correct processing of the configuration.

The overhead signals that need to be transported over the additional resize overhead channel are in particular from the HO OPUk OH RCOH1 position the RP bit and 4 TPID bits, from the HO OPUk OH RCOH2 position the TSCC, TSGS bits and the two CTRL and TPID bits, and from the OPUflex overhead the BWR_IND carried in the RCOH1 and the BWR_IND and NCS bits carried in the RCOH1 positions.

So in this respect the additional Resize OH channel for ODUflex protection has to carry from the OPUflex RCOH the RCOH1—BWR_IND, the RCOH2—BWR_IND and NCS Bits, and has to support an error detection identical or equivalent to the CRC-3 defined in the RCOH3 and from the HO OPUk OH RCOH1 position the RP bit and the 4 TPID bits, RCOH2 position the TSCC, TSGS bits and the two CTRL and TPID Bits, and for the RCOH3 positions and support an error detection identical or equivalent to the CRC3 as well as CRC-5 defined in G.7044 and shown in Figure 6-2—RCOH format of G.7044.

In FIG. 6, as in FIGS. 4 and 5, the network connection between a first and a second network node is bidirectional and signal flow and processing is symmetrical in the two directions. Therefore, only one direction, i.e. from left to the right on FIG. 6 is described in more detail below. As in FIG. 5, the vertical double arrows labeled with BWR and LCR, respectively, indicate a bidirectional protocol exchange of resize overhead messages in go and return directions (i.e., from left to right and vice versa) between nodes terminating a section in case of LCR protocol stage and end-to-end in case of BWR protocol stage.

The left network node contains a source function 70 for an ODUflex, which carries a GFP encoded client signal. Source function 70 connects to a connection function 71, which connects the ODUflex CI signal coming from ODUflex source function 70 to HO ODUk source functions 72, where the ODUflex is adapted to and multiplexed into ODUk for transmission over network paths 74. A redundant protection network path 75 exists, but is currently not connected with ODUflex source 70. Conversely, protection path 75 can be used for the transmission of a low priority traffic signal 82 that has to be preempted in the case of a failure along active path 74 before a protection switch-over from active path 54 can be initiated. For instance, network paths 74, 75 can represent the active and protection paths of a 1+1 SNC (sub-network protection connection). Accordingly, ODUk source function 73 is connected through connection function 71 to a source (not shown) of low priority traffic signal 82.

RP and TSCC signals from ODUflex source 70 are connected to ODUk source 72 and are bridged to a resize OH processor 83, which embeds the ODUflex resize information into a separate Resize OH channel and maps the latter via ODUk source 73 into the outgoing HO ODUk.

At the connection function 71 where the protection is sourced, the resize related overhead signals of the resize protocol, ie ODUk_CI_RP and ODUk_CI_TSCC of ODUflex<n>, are bridged into the resize OH channel of the protection entity, which may be currently used for other traffic. The CI of the ODUflex is not permanently bridged onto the adaptation function 73 and only bridged if requested by the protection protocol.

At the right hand network node, where network paths 74, 75 are terminated by respective ODUk termination functions 76, 77, the ODUflex CI signal is extracted from the ODUk received from active path 74 and fed to a connection function 78. A selector 85 of inside connection function 78 selects under normal operation the signal received from the active path 74 and switches in case of a failure to the signal received from the protection path 75, after traffic on this path has been preempted and switch-over at the left side node has been signaled using an appropriate protection protocol. A selector 86, which selects in normal operation the extra traffic signal from protection path 75 and connects it to an appropriate output will at the same time deselect the ODUflex CI signal from protection path 75, which after a bridge set successfully by connection 71, carries the protected ODUflex CI signal from ODUflex source function 70. The protection protocol as such is described here as it is generally known to those skilled in the art.

A resize OH processor 84 is provided, which receives resize overhead signals extracted at ODUk termination function 77 from the received resize overhead channel and extracts the TSCC and RP signals, which were originally sent by resize OH processor 83. These TSCC and RP signals and the TSCC and RP signals received at ODUk termination function 76 are fed to connection function 78, where they undergo special processing similar to the previous embodiment.

At the connection function 78 providing the sink end of the protection group the ODUk_CI_RP and ODUk_CI_TSCC signals provided by the new resize OH channel for shared protection will be combined using similar logic functions as for the 1+1 and will be fed to the ODUflex<N> termination function 79.

In particular, logic function 80 will thus output logic 1 if and only if both RP from active path 74 and the one received in the additional resize overhead channel on protection paths 75 and extracted by resize overhead processor 84 indicate a transition from 0 to 1 and will output logic 0 otherwise. Conversely, logic function 80 (similar to logic function 60 in FIG. 5) will return back from logic 1 to logic 0 if and only if RP from active path 74 and protection paths 75 indicate a transition from 1 to 0 and will continue outputting logic 1 otherwise. Logic function 81 performs a logic AND on the TSCC from active and protection paths 74, 75.

For shared or 1:N protection the emulated interim HO sections of the protection sections are to be resized via identical management commands per lower order protected ODUflex in the same way as the worker entities. This will ensure that the worker entity and the emulated protection entity are resized in a coordinated way and the BWR (bandwidth resize protocol) is triggered for both together and so at any time the same bandwidth would be available at worker and protection entity and no extra hit is created.

In the case of a protection switch execution the emulated configuration of the HO/LO adaptations together with the bridge and switch (selector) request needs to be loaded into the adaptations and connection functions of the protection entities and configure the used protection entities. With this, the traffic impact is minimized and also during resize operation a matching signal structure is immediately available. In case the protection or worker entity is not available, the TSCC and RP signal is not available at the ODUflex termination and the resize protocol processing is not completed and the link is not resized on both entities, thus keeping the protection connection operable at any time.

It should be understood, that instead of ODUflex termination function 59 in FIG. 5 or ODUflex termination function 79 in FIG. 6, the ODUflex can also be connected to another output and continued via subsequent HO sections as for network node B in FIG. 2 does.

A network node, to support the resizing of a protected ODUflex connection has a number of network interfaces for optical transport signals. In particular, to support a 1:1 or a 1+1 protection, the network node needs at least two interfaces, one that receives the active path and the protection path. Referring to FIGS. 1 and 2, the interfaces will typically contain the OTUk termination, HO ODUk adaptation, ODUk termination, and LO ODUk adaptation functions 13-16, 13'-16', 21-24, and 21'-24'.

Referring to FIGS. 5 and 6, the network node will further contain a connection function 58, 78 for LO ODUk. This can be a LO switch matrix, which switches individual tributary slots of HO ODUk signals, but can be also a dedicated protection switching function. The connection function performs a sink side termination function for a protection group, where, depending on the type of protection, the protection group contains at least one active path and at least one protection path.

Termination of the protection group would involve a connection of the active path to a LO ODUk termination function 59, 79, typically residing on a user or tributary interface of the node. The BWR part of a resize operation is performed by such LO ODUk termination function 59, 79, while the LCR part of a resize operation is performed between by the section terminating network interfaces along the active and protection paths.

The connection function will perform the logical operations on the resize protocol signals TSCC and RP received on the active and protection paths and output single logically processed TSCC and RP signals towards the LO ODUk termination function 59, 79.

It should be clear, although the logical operations to be performed on the TSCC and RP signals logically belong to the connection function that terminates the protection group, those functions can physically be implemented separately. For instance, the processing to logical combine TSCC and/or RP signals from active and protection paths can be implemented on the interface board that terminates the LO ODUk or can be implemented in a central connection functions such as a switch matrix, which actually performs the switchover from active to protection path in case of a failure.

It should also be clear, that when a protection group contains more than one active and one protection paths, such as for N:1 or N:M protection schemes, more than just two TSCC and/or RP signals can be logically processed and combined at a time. Depending on how many of the members of a protection group shall be resized and for which resizing operations shall be synchronized, the TSCC and/or RP signals of these members will be subject to logical processing and combination.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, or through the interaction of program control and dedicated logic, the particular technique being selectable by the implementer as more specifically understood from the context.

The invention claimed is:

1. A method of resizing in an optical transport network a protected connection being represented by a lower order optical data unit of flexible size, said protected connection comprises at least one active path and at least one protection path together forming a protection group, said method of resizing being carried out using a resize protocol comprising a link connection resize protocol part and a bandwidth resize protocol part, said method comprising:
   carrying out said link connection resize protocol part to resize links along said at least one active path and at least one protection path;
   carrying out said bandwidth resize protocol part to resize a capacity of said lower order optical data unit of flexible size, wherein said bandwidth resize protocol part is triggered for both said active path and said protection path;
   transmitting confirmation signals indicating success or failure of resizing said links along said at least one active path and said at least one protection path, respectively, to a connection function terminating said protection group; and
   at said connection function, logically combining said confirmation signals transmitted along said at least one active path and said at least one protection path.

2. The method according to claim 1, wherein said step of logically combining said confirmation signals includes a Boolean AND operation.

3. The method according to claim 2, wherein said confirmation signals are Tributary slot connectivity check bits transmitted in an overhead position of higher order optical data units carrying said lower order optical data unit of flexible size.

4. The method according to claim 1, further comprising:
   transmitting status signals indicating activation and termination of a resize operation along said at least one active path and said at least one protection path, respectively, to said connection function terminating said protection group, and
   at said connection function, logically combining said status signals transmitted along said at least one active path and said at least one protection path.

5. The method according to claim 4, wherein said step of logically combining said status signals includes an operation
   which changes an output state from logic 0 to logic 1 on a condition that said status signals transmitted over said active path and over said protection path indicate a transition from 0 to 1 and continues outputting logic 0 otherwise, and
   which changes an output state from logic 1 to logic 0 on a condition that said status signals transmitted over said active path and over said protection path indicate a transition from 1 to 0 and continues outputting logic 1 otherwise.

6. The method according to claim 4, wherein said confirmation signals are Resizing protocol indicator bits transmitted in an overhead position of higher order optical data units carrying said lower order optical data unit of flexible size.

7. The method according to claim 4, wherein said confirmation signal and/or said status signal is/are sent over said at least one protection path over an additional overhead channel, which is separate from a resize overhead defined within an overhead position of higher order optical data units carrying said lower order optical data unit of flexible size.

8. A network node for use in an optical transport network comprising:
   a number of network interfaces for optical transport signals carrying higher order optical data units; and
   a connection function for lower order optical data units transported within a payload section of higher order optical data units, wherein said connection function is adapted to perform a sink side termination function for a protection group comprising at least one active path and at least one protection path, and wherein said connection function is further adapted to logically combine confirmation signals received as part of a resizing protocol from said at least one active path and from said at least one protection path, said confirmation signals indicate success or failure of a resizing of links along said at least one active path and said at least one protection path, respectively; and
   wherein said connection function is further adapted to logically combine status signals received as part of said resizing protocol from said at least one active path and from said at least one protection path, said status signals indicate activation and termination of a bandwidth resize operation along said at least one active path and said at least one protection path, respectively.

9. The network node according to claim 8, wherein said connection function is further adapted to perform a Boolean AND operation on said confirmation signals.

10. The network node according to claim 8, wherein said connection function is further adapted to perform a logic operation
    which changes an output state from logic 0 to logic 1 on a condition that said status signals received from said active path and from said protection path indicate a transition from 0 to 1 and continues outputting logic 0 otherwise, and
    which changes an output state from logic 1 to logic 0 on a condition that said status signals transmitted over said active path and over said protection path indicate a transition from 1 to 0 and continues outputting logic 1 otherwise.

11. The network node according to claim 8, further comprising a sink side resize overhead processor, which extracts said confirmation signal and/or said transmitting status signal received at said at least one protection path from an additional overhead channel, which is separate from a resize overhead defined within an overhead position of higher order optical data units carrying said lower order optical data unit of flexible size.

12. The network node according to claim 11, further comprising a source side resize overhead processor which embeds said confirmation signal and/or said status signal to be transmitted in a return direction over a return direction protection path into said additional overhead channel being separate from a resize overhead defined within an overhead position of higher order optical data units carrying said lower order optical data unit of flexible size.

* * * * *